United States Patent
Jin et al.

(10) Patent No.: US 8,839,276 B2
(45) Date of Patent: Sep. 16, 2014

(54) OPEN APPLICATION PROGRAMMING INTERFACE SELECTION METHOD AND DEVICE

(71) Applicant: Huawei Technologies Co., Ltd., Shenzhen (CN)

(72) Inventors: Hongbo Jin, Shenzhen (CN); Youliang Yan, Shenzhen (CN); Quan Qi, Shenzhen (CN); Shizhan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/081,318

(22) Filed: Nov. 15, 2013

(65) Prior Publication Data

US 2014/0075460 A1    Mar. 13, 2014

Related U.S. Application Data

(63) Continuation of application No. PCT/CN2011/074413, filed on May 20, 2011.

(51) Int. Cl.
G06F 13/00 (2006.01)
G06F 9/445 (2006.01)
G06F 9/44 (2006.01)
G06F 9/54 (2006.01)

(52) U.S. Cl.
CPC ............ *G06F 9/541* (2013.01); *G06F 9/44521* (2013.01); *G06F 8/36* (2013.01); *G06F 9/44536* (2013.01)
USPC .......................................................... 719/328

(58) Field of Classification Search
CPC ...................................................... G06F 9/541
USPC ........................................................... 719/328
See application file for complete search history.

(56) References Cited

U.S. PATENT DOCUMENTS

| 8,739,189 B2 * | 5/2014 | Dalcher ................... 719/328 |
| 2003/0233602 A1 | 12/2003 | Lindquist et al. |
| 2004/0030627 A1 * | 2/2004 | Sedukhin .................. 705/36 |
| 2008/0127062 A1 | 5/2008 | Kim |
| 2011/0113405 A1 | 5/2011 | Guerrera et al. |

FOREIGN PATENT DOCUMENTS

| CN | 1320874 | 11/2001 |
| CN | 1625121 | 6/2005 |
| CN | 101364899 | 2/2009 |
| CN | 101553802 | 10/2009 |
| CN | 101562621 | 10/2009 |
| CN | 101976188 | 2/2011 |

OTHER PUBLICATIONS

Chinese Office Action dated Dec. 5, 2012 in corresponding Chinese Patent Application No. 201180000544.2.

(Continued)

*Primary Examiner* — Andy Ho
(74) *Attorney, Agent, or Firm* — Staas & Halsey LLP (57) ABSTRACT

Embodiments of the present invention provide an open application programming interface selection method and device. The method includes: receiving an invocation request from a user, where the invocation request includes an OpenAPI function parameter; determining an OpenAPI equivalent set according to the OpenAPI function parameter; and selecting a target OpenAPI from multiple OpenAPIs according to a Qos attribute value that corresponds to each OpenAPI in the OpenAPI equivalent set. By adopting the embodiments of the present invention, an OpenAPI with better performance can be selected from numerous OpenAPIs with equivalent functions for a user, thereby improving the quality of service for the user.

16 Claims, 6 Drawing Sheets

(56) References Cited

OTHER PUBLICATIONS

Extended European Search Report dated Nov. 7, 2013 in corresponding International Patent Application No. PCT/CN2011074413.
PCT International Search Report and Written Opinion of the International Searching Authority issued Oct. 27, 2011 in corresponding International Patent Application No. PCT/CN2011/074413.
"QoS-based Late-Binding of Service Invocations in Adaptive Business Processes", Châtel et al., 2010 IEEE International Conference on Web Services, pp. 227-234.

"Efficient QoS-Aware Service Composition with a Probabilistic Service Selection Policy", Klein et al., ICSOC 2010, LNCS 6470, 2010, pp. 182-196.
"Model of Web Services with QoS Based on MAS", Kai et al., Computer & Digital Engineering, China Academic Journal Electronic Publishing House, Jun. 6, 2009, vol. 37, No. 9, pp. 76-79.
International Search Report mailed Oct. 27, 2011 in corresponding International Application No. PCT/CN2011/074413.

* cited by examiner

OPEN APPLICATION PROGRAMMING INTERFACE SELECTION METHOD AND DEVICE

CROSS-REFERENCE TO RELATED APPLICATIONS

This application is a continuation of International Application No. PCT/CN2011/074413, filed on May 20, 2011, which is hereby incorporated by reference in its entirety.

FIELD OF THE INVENTION

Embodiments of the present invention relate to the programming interface field, and in particular, to an open application programming interface (Open Application Programming Interface; referred to as OpenAPI) selection method and device.

BACKGROUND OF THE INVENTION

With the development of an OpenAPI technology, OpenAPI providers become more and more, the number of OpenAPIs available on the Internet (Internet) also increases continuously, and the number of OpenAPIs with the same function also increases continuously, which provides more selections for a user.

However, different OpenAPIs with equivalent functions are much different in the aspect of response time, reliability, and stability, and therefore, how to select an OpenAPI with better performance from numerous OpenAPIs with equivalent functions becomes a big problem that hinders further development and popularization of the OpenAPI technology.

SUMMARY OF THE INVENTION

Embodiments of the present invention provide an open application programming interface selection method and device, so that an OpenAPI with better performance can be selected from numerous OpenAPIs with equivalent functions.

An embodiment of the present invention provides an open application programming interface OpenAPI selection method, including:
  receiving an invocation request from a user, where the invocation request includes an OpenAPI function parameter;
  determining an OpenAPI equivalent set according to the OpenAPI function parameter, where the OpenAPI equivalent set includes multiple OpenAPIs with the same function; and
  selecting a target OpenAPI from the multiple OpenAPIs according to a quality of service Qos attribute value that corresponds to each OpenAPI in the OpenAPI equivalent set.

An embodiment of the present invention provides an open application programming interface OpenAPI selection device, including:
  a receiving unit, configured to receive an invocation request from a user, where the invocation request includes an OpenAPI function parameter;
  a determining unit, configured to determine an OpenAPI equivalent set according to the OpenAPI function parameter, where the OpenAPI equivalent set includes multiple OpenAPIs with the same function; and
  a selecting unit, configured to select a target OpenAPI from the multiple OpenAPIs according to a quality of service Qos attribute value that corresponds to each OpenAPI in the OpenAPI equivalent set.

With the open application programming interface OpenAPI selection method and device in the embodiments of the present invention, after a invocation request from a user is received, multiple OpenAPIs with the same function are determined according to the invocation request, and then a target OpenAPI is selected from the multiple OpenAPIs according to a Qos attribute value of each OpenAPI. In the embodiments of the present invention, a Qos attribute value is used to reflect performance of different OpenAPIs with the same function, based on which a target OpenAPI is selected from the different OpenAPIs, thereby selecting an OpenAPI with better performance for a user, and improving the quality of service for the user.

BRIEF DESCRIPTION OF THE DRAWINGS

To describe the technical solutions in the embodiments of the present invention more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make objectives, technical solutions, and advantages of embodiments of the present invention more comprehensible, the technical solutions in the embodiments of the present invention are described clearly in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
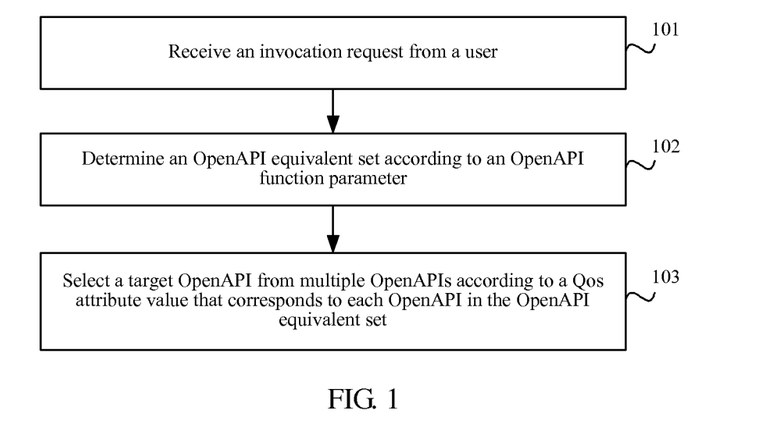
FIG. 1 is a flow chart of an OpenAPI selection method according to a first embodiment of the present invention.

FIG. 1 is a flow chart of an OpenAPI selection method according to a first embodiment of the present invention. As shown in FIG. 1, the method in this embodiment includes:

Step 101: Receive an invocation request from a user.

Specifically, a user sends an invocation request for invoking an OpenAPI to an OpenAPI selection device (hereinafter referred to as selection device) in this embodiment. The invocation request includes an OpenAPI function parameter, and the OpenAPI function parameter is not only used to indicate which function the user needs to complete, but also used to indicate an OpenAPI type the selection device needs to select.

Step 102: Determine an OpenAPI equivalent set according to the OpenAPI function parameter.

Multiple OpenAPI equivalent sets grouped based on functions are pre-stored in an OpenAPI database. Each OpenAPI equivalent set includes multiple OpenAPIs with the same function. In this embodiment, the selection device determines, from multiple OpenAPI equivalent sets according to the OpenAPI function parameter, an OpenAPI equivalent set that includes an OpenAPI needed by the user.

Step 103: Select a target OpenAPI from multiple OpenAPIs according to a Qos attribute value that corresponds to each OpenAPI in the OpenAPI equivalent set.

The selection device pre-stores a Qos attribute value that corresponds to each invoked OpenAPI in the OpenAPI database. The Qos attribute value is used to represent performance of each OpenAPI, and a Qos attribute is pre-defined according to a Qos indicator of a Web service, in combination of a special requirement of an OpenAPI field, and in view of availability and measurability. Each Qos attribute has one value, used to indicate whether a Qos attribute is good, to which this embodiment is not limited.

In this embodiment, after determining the OpenAPI equivalent set, the selection device obtains a Qos attribute value that corresponds to each OpenAPI in the OpenAPI equivalent set, and selects one OpenAPI from multiple OpenAPIs with the same function as a target OpenAPI.

With the OpenAPI selection method in this embodiment, a Qos attribute value is used to reflect performance of different OpenAPIs with the same function, based on which a target OpenAPI is selected, thereby solving a problem in the prior art that an OpenAPI with better performance cannot be selected from numerous OpenAPIs with equivalent functions, selecting an OpenAPI with better performance for a user, and improving the quality of service for the user.

It is noted herein that, in the embodiments of the present invention, a Qos attribute may include a subjective Qos attribute and/or an objective Qos attribute, where the subjective Qos attribute mainly reflects an evaluation of a user on an OpenAPI, while the objective Qos attribute mainly reflects performance of an OpenAPI in an invocation process. The subjective Qos attribute may include any one of the following or a combination thereof: usability (Usability), correctness (Correctness), performance/price (Performance/Price), and subjective Security (Security). The usability is used to reflect whether an OpenAPI invocation process is simple, and whether a returned result is easy to understand. The correctness is used to evaluate whether a result obtained after an OpenAPI is invoked is a result expected by a user. The performance/price refers to a ratio of an actual application value of an OpenAPI to a price charged for invoking the OpenAPI by a user. The subjective security refers to the evaluation, from a user after invoking an OpenAPI, about whether the OpenAPI is secure. In addition, weighted average processing may further be performed on the foregoing subjective Qos attributes, so as to obtain a comprehensive subjective evaluation value. The objective Qos attribute may include any one of the following or a combination thereof: encryption security, response time (Response Time), availability (Availability), and stability (Stability). The encryption security refers to whether a transmission process of OpenAPI invocation is encrypted. The response time refers to rapidity of OpenAPI invocation, namely, a time difference between time at which a user initiates invocation and time at which the user obtains a returned result. The availability is used to evaluate whether a current OpenAPI is available, and may be represented by a success rate of OpenAPI invocation of a user. The stability may be indicated by mean time between failures (Mean Time between Failures; referred to as MTBF), and refers to average working time between two OpenAPI invocation failures.

Figure 2:
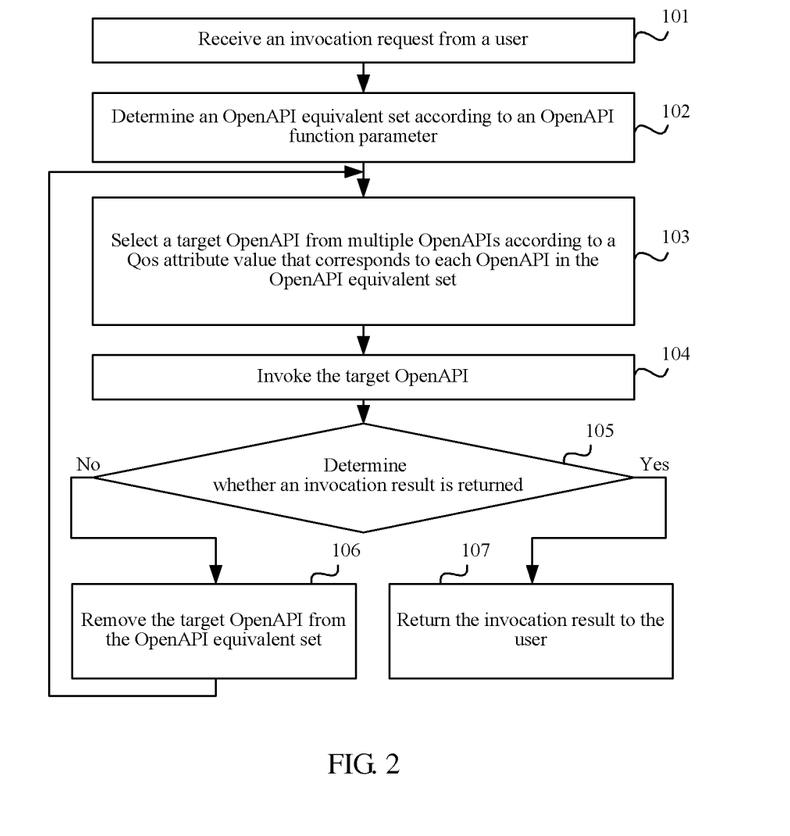
FIG. 2 is a flow chart of an OpenAPI selection method according to a second embodiment of the present invention.

FIG. 2 is a flow chart of an OpenAPI selection method according to a second embodiment of the present invention. This embodiment is implemented based on the first embodiment, and as shown in FIG. 2, the method in this embodiment further includes the following steps after step 103.

Step 104: Invoke the target OpenAPI.

After selecting the target OpenAPI, the selection device further invokes the selected target OpenAPI from the OpenAPI database. A process of invoking the target OpenAPI from the OpenAPI database includes: The selection device obtains a parameter list of the target OpenAPI; the selection device provides an invocation interface for the user, where the parameter list of the target OpenAPI is displayed on the invocation interface; after inputting parameter information of the target OpenAPI through the invocation interface, the user submits an invocation acknowledgment by clicking an invocation function provided on the invocation interface; and then the selection device invokes the OpenAPI from the OpenAPI database. After the invocation is successful, the OpenAPI database returns an invocation result to the selection device; while if the invocation is not successful, the OpenAPI database does not return an invocation result.

Step 105: Determine whether an invocation result is returned. If a determination result is no, execute step 106; and if the determination result is yes, execute step 107.

Specifically, after invoking the target OpenAPI, the selection device determines whether the OpenAPI database returns an invocation result, namely, determines whether the invocation is successful. The selection device may preset time at which the OpenAPI database returns an invocation result, so that the selection device may determine whether an invocation result is returned by determining whether the time expires. In addition, the selection device may also determine, through a status code, whether an invocation result is returned.

Step 106: Remove the target OpenAPI from the OpenAPI equivalent set, and re-execute step 103.

When the invocation is not successful, it indicates that the OpenAPI database does not have the target OpenAPI, and therefore, the selection device removes the target OpenAPI from the OpenAPI equivalent set, and re-execute step 103 to reselect a new target OpenAPI for the user. At this time, the OpenAPI equivalent set is an OpenAPI equivalent set where the previously selected target OpenAPI is removed.

Step 107: Return the invocation result to the user.

When the invocation is successful, the selection device returns the invocation result to the user.

Further, the step may further include: The user returns a subjective evaluation result on the invocation of the target OpenAPI, namely, a process of returning a subjective Qos attribute value. An operation that the user returns a subjective Qos attribute value is further described subsequently.

With the OpenAPI selection method in this embodiment, a selected target OpenAPI is invoked, and when the invocation is not successful, selection is continued in an OpenAPI equivalent set where the OpenAPI that is not successfully invoked is removed, so as to ensure that a target OpenAPI is successfully selected for a user, and ensure that the user obtains a service, thereby improving the quality of service of an OpenAPI for the user.

Figure 3A:
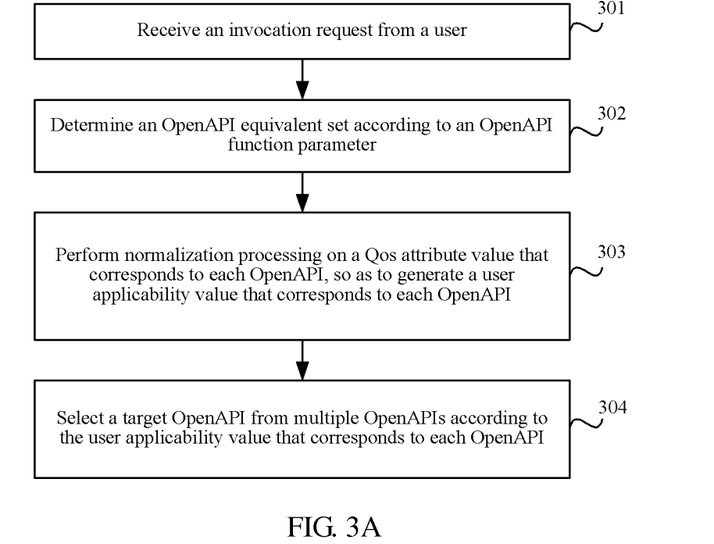
FIG. 3A is a flow chart of an OpenAPI selection method according to a third embodiment of the present invention.

FIG. 3A is a flow chart of an OpenAPI selection method according to a third embodiment of the present invention. As shown in FIG. 3A, the method in this embodiment includes:

Step 301: Receive an invocation request from a user.

Step 302: Determine an OpenAPI equivalent set according to an OpenAPI function parameter.

Reference is made to descriptions of step 101 and step 102 for details of step 301 and step 302, which are not described herein again.

Step 303: Perform normalization processing on a Qos attribute value that corresponds to each OpenAPI, so as to generate a user applicability value that corresponds to each OpenAPI.

The Qos attribute value that corresponds to each OpenAPI is used for a selection device to select a most suitable physical OpenAPI from multiple OpenAPIs with the same function. When each OpenAPI corresponds to multiple Qos attributes, the larger some Qos attribute values are, for example, availability, the higher the performance of an OpenAPI is; while the smaller some Qos attribute values are, for example, response time, the higher the performance of an OpenAPI is. A Qos attribute, in which the larger a Qos attribute value is, the higher the performance of an OpenAPI is, is called an increment Qos attribute, and correspondingly, a value of the Qos attribute is called an increment Qos attribute value. A Qos attribute, in which the smaller a Qos attribute value is, the higher the performance of an OpenAPI is, is called a decrement Qos attribute, and correspondingly, a value of the Qos attribute is called a decrement Qos attribute value. To facilitate calculation, in this embodiment, the selection device performs normalization processing on various Qos attribute values to generate a user applicability value, and uses an indicator, namely, the user applicability value, to evaluate the performance of an OpenAPI.

Specifically, the selection device performs normalization processing on the increment Qos attribute value according to formula (1).

$$v(Q_i^k) = \begin{cases} \dfrac{Q_i^k - \min\limits_{i=1}^{n} Q_i^k}{\max\limits_{i=1}^{n} Q_i^k - \min\limits_{i=1}^{n} Q_i^k}, & \max\limits_{i=1}^{n} Q_i^k - \min\limits_{i=1}^{n} Q_i^k \neq 0 \\ 1, & \max\limits_{i=1}^{n} Q_i^k - \min\limits_{i=1}^{n} Q_i^k = 0 \end{cases} \quad (1)$$

The selection device performs normalization processing on the decrement Qos attribute value according to formula (2).

$$v(Q_i^k) = \begin{cases} \dfrac{\max\limits_{i=1}^{n} Q_i^k - Q_i^k}{\max\limits_{i=1}^{n} Q_i^k - \min\limits_{i=1}^{n} Q_i^k}, & \max\limits_{i=1}^{n} Q_i^k - \min\limits_{i=1}^{n} Q_i^k \neq 0 \\ 1, & \max\limits_{i=1}^{n} Q_i^k - \min\limits_{i=1}^{n} Q_i^k = 0 \end{cases} \quad (2)$$

$Q_i^k$ indicates a kth Qos attribute value of an ith OpenAPI; $v(Q_i^k)$ indicates a kth normalized Qos attribute value of the ith OpenAPI; n indicates the number of OpenAPIs; i=1 ... n; and k=1 ... m, where m indicates the number of Qos attributes of each OpenAPI. For example, when Qos attributes that correspond to each OpenAPI include usability, correctness, performance/price, security, response time, availability, and stability at the same time, m is 7.

It is noted herein that, when a Qos attribute that corresponds to an OpenAPI includes only an increment Qos attribute, normalization processing may be performed only according to formula (1), and normalization processing may also not be performed. Similarly, when a Qos attribute that corresponds to an OpenAPI includes only a decrement Qos attribute, normalization processing may be performed only according to formula (2), and normalization processing may also not be performed.

After performing the normalization processing, the selection device may perform weighted average processing on the normalization-processed Qos attribute value according to formula (3), so as to generate a user applicability value.

$$U_i = \sum_{k=1}^{m} (w_k v(Q_i^k)) \quad (3)$$

$w_k$ indicates a weighted value of a kth normalized Qos attribute value of each OpenAPI; in this embodiment, the weighted value is preset, and for each OpenAPI, the $w_k$ is the same, to which this embodiment is not limited; and $U_i$ indicates a user applicability value that corresponds to the ith OpenAPI.

Step 304: Select a target OpenAPI from multiple OpenAPIs according to a user applicability value that corresponds to each OpenAPI.

The larger a user applicability value obtained according to a normalization-processed Qos attribute value is, the better the performance of an OpenAPI is.

An implementation manner of step 304 is: The selection device selects an OpenAPI with a maximum user applicability value from the multiple OpenAPIs as the target OpenAPI. Specifically, the selection device compares multiple obtained user applicability values, obtains a maximum user applicability value, and further uses an OpenAPI with the maximum user applicability value as the target OpenAPI. The implementation manner is easy to implement, and the selected target OpenAPI is a best OpenAPI, and after the target OpenAPI is invoked, the user can obtain a service with high quality of service.

Figure 3B:
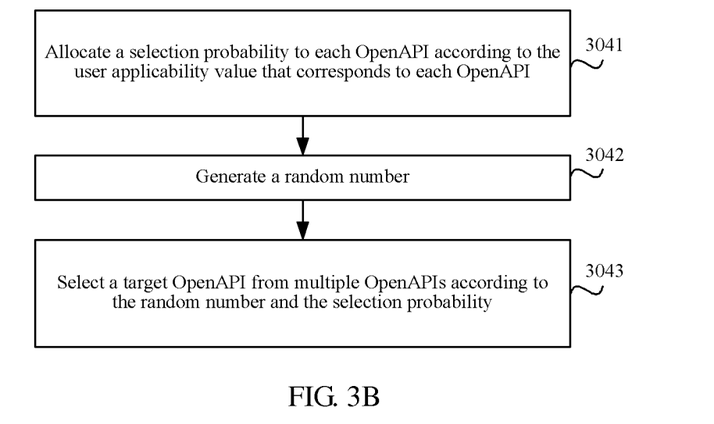
FIG. 3B is a flow chart of an implementation method of step 304 according to the third embodiment of the present invention.

Further, an embodiment provides another implementation manner of step 304, and as shown in FIG. 3B, and the implementation manner includes:

Step 3041: Allocate a selection probability to each OpenAPI according to a user applicability value that corresponds to each OpenAPI.

A selection device allocates a different selection probability to each OpenAPI, and ensures that an OpenAPI with better performance is allocated a large selection probability. That is to say, the larger a user applicability value of an OpenAPI is, the larger a selection probability allocated by the selection device to the OpenAPI is. A sum of all selection probabilities allocated by the selection device is 1. Assuming that there are n OpenAPIs, which are sorted in ascending order: apiid1, apiid2, ..., apiidi, ..., apiidn, corresponding selection probabilities are p1, p2, ..., pi, ..., pn respectively, where p1+p2+ ... +pi+ ... +pn=1. n+1 probability intervals are formed by n selection probabilities.

Step 3042: Generate a random number.

Specifically, the selection device generates a random number from 0 to 1 according to a certain algorithm.

Step 3043: Select a target OpenAPI from multiple OpenAPIs according to the random number and the selection probability.

Specifically, the selection device sorts selection probabilities in ascending order; and then compares the random number with the sorted selection probabilities in sequence, until finds, through comparison, a first selection probability that is larger than the random number, and selects an OpenAPI that corresponds to the first selection probability that is larger than the random number as the target OpenAPI. That is to say, the selection device determines which probability interval the random number is in, selects an OpenAPI that corresponds to an upper limit of the probability interval, and uses the OpenAPI as the target OpenAPI.

In this implementation manner, a random number from 0 to 1 is generated, and a target OpenAPI is selected according to the random number and a selection probability that is allocated to an OpenAPI, which can ensure that an OpenAPI with a larger probability is more likely to be selected, that is to say, it can ensure that an OpenAPI with better performance has a higher probability to be selected, and furthermore, it can also ensure that each OpenAPI is likely to be selected.

Step 303 and step 304 may be considered as an implementation manner of step 103.

With the OpenAPI selection method in this embodiment, normalization processing is performed on a Qos attribute value to obtain a user applicability value, a target OpenAPI is selected according to the user applicability value, the user applicability value is used to reflect performance of different OpenAPIs with the same function, based on which the target OpenAPI is selected, thereby simplifying an operation of selecting the target OpenAPI, solving a problem in the prior art that a better OpenAPI cannot be selected from numerous OpenAPIs with equivalent functions, selecting an OpenAPI with better performance for a user, and improving the quality of service for the user.

Figure 4:
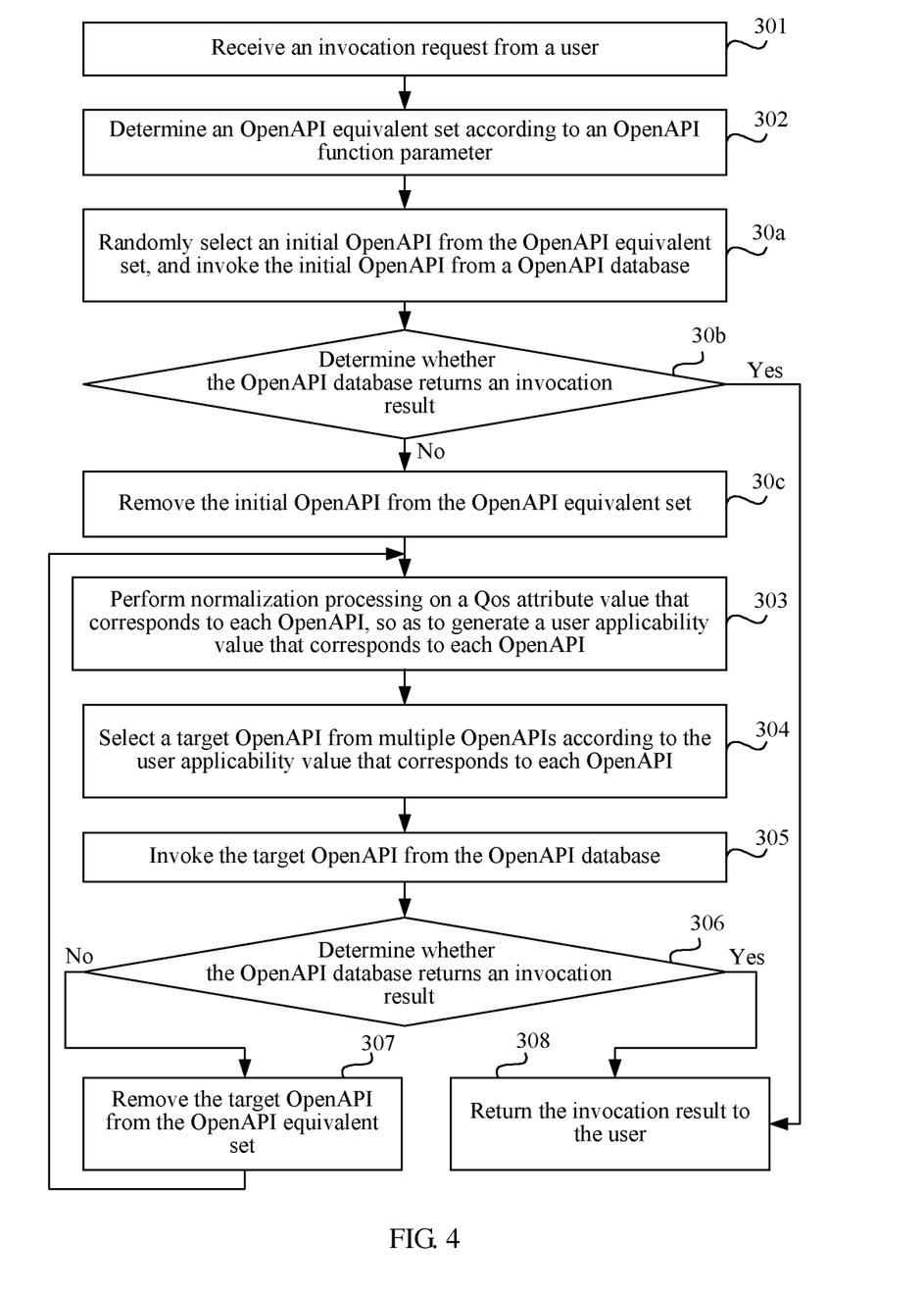
FIG. 4 is a flow chart of an OpenAPI selection method according to a fourth embodiment of the present invention.

FIG. 4 is a flow chart of an OpenAPI selection method according to a fourth embodiment of the present invention. This embodiment is implemented based on the third embodiment, and as shown in FIG. 4, before step 303, the method in this embodiment includes:

Step 30a: Randomly select an initial OpenAPI from the OpenAPI equivalent set, and invoke the initial OpenAPI from an OpenAPI database.

Specifically, a selection device randomly selects one OpenAPI from the OpenAPI equivalent set as the initial OpenAPI, and obtains a parameter list of the initial OpenAPI; and then, displays the parameter list of the initial OpenAPI to the user through an invocation interface; after the user inputs parameter information of the initial OpenAPI through the invocation interface, receives the parameter information of the initial OpenAPI, where the parameter information of the initial OpenAPI is submitted by the user through the invocation interface; and invokes the initial OpenAPI from the OpenAPI database according to the parameter information. Reference may be made to the description of the invocation of the target OpenAPI in step 104 in the second embodiment for a process of invoking the initial OpenAPI from the OpenAPI database.

Step 30b: Determine whether the OpenAPI database returns an invocation result. If a determination result is no, execute step 30c; and if the determination result is yes, execute step 308.

Reference may be made to the description in step 105 for a specific method for determining whether an invocation result is returned, which is not described herein again. If the invocation result is returned, it indicates that the invocation is successful; while if no invocation result is returned, it indicates that the invocation fails.

Step 30c: Remove the initial OpenAPI from the OpenAPI equivalent set, and proceed to and execute step 303 and step 304.

The foregoing steps are used to, before a target OpenAPI is selected according to a Qos attribute value, randomly select one OpenAPI from the OpenAPI equivalent set first and invoke the OpenAPI from the OpenAPI database. If the invocation is successful, subsequent steps are not executed, so that an OpenAPI invocation procedure may be saved, and efficiency of the OpenAPI invocation may be improved. If the invocation is not successful, an OpenAPI with better performance is further selected from multiple OpenAPIs according to the Qos attribute value, so that a success rate of the invocation may be improved, and the efficiency of the OpenAPI invocation may be improved.

Further, as shown in FIG. 4, after step 304, the method in this embodiment further includes:

Step 305: Invoke the target OpenAPI from the OpenAPI database.

Step 306: Determine whether the OpenAPI database returns an invocation result. If a determination result is no, execute step 307; and if the determination result is yes, execute step 308.

Step 307: Remove the target OpenAPI from the OpenAPI equivalent set, and proceed to and execute step 303.

Step 308: Return the invocation result to the user, and end this OpenAPI invocation operation.

Reference may be made to the description of step 104 to step 107 in the second embodiment for the foregoing step 305 to step 308, which are not described herein again.

With the OpenAPI selection method in this embodiment, before a target OpenAPI is selected according to a Qos attribute value, one OpenAPI is randomly selected from an OpenAPI equivalent set first, and is invoked from an OpenAPI database, and when invocation of an initial OpenAPI is successful, subsequent steps are not executed, so that an OpenAPI invocation procedure may be saved, and efficiency of the OpenAPI invocation may be improved; while when the invocation of the initial OpenAPI is not successful, an OpenAPI with better performance is further selected from multiple OpenAPIs according to the Qos attribute value, so that a success rate of the invocation may be improved, and the efficiency of the OpenAPI invocation may be improved.

Further, in the foregoing embodiments, before the selecting a target OpenAPI from multiple OpenAPIs according to a Quality of service Qos attribute value that corresponds to each OpenAPI in an OpenAPI equivalent set, the method includes: an operation of generating the Qos attribute value that corresponds to each OpenAPI. In the embodiments of the present invention, A Qos attribute may include an objective Qos attribute and/or a subjective Qos attribute. The objective Qos attribute mainly reflects performance of an OpenAPI in an invocation process, and therefore, an objective Qos attribute value that corresponds to each OpenAPI is mainly obtained by detecting each OpenAPI invocation process. The subjective Qos attribute is mainly an evaluation of a user on an OpenAPI, and therefore, a subjective Qos attribute value is mainly fed back by a test user after each OpenAPI is invoked. It is noted herein that, the test user refers to a user related to obtaining a Qos attribute value of an OpenAPI, may be a user that is responsible for invoking an OpenAPI in a test environment that is dedicated to obtain a Qos attribute value of an OpenAPI, and may also be a user that can provide a Qos attribute value of an OpenAPI by invoking the OpenAPI in an actual application environment, for example, the user in the foregoing embodiments may serve as the test user herein. In an actual application process, obtaining an objective Qos attribute value and/or subjective Qos attribute value, which corresponds to an OpenAPI, is an exemplary implementation manner.

Further, after the objective Qos attribute value and/or Qos attribute value, which corresponds to the OpenAPI, is obtained, the obtained objective Qos attribute value and/or the obtained subjective Qos attribute value is further stored in a Qos attribute information table, and invocation information in an OpenAPI invocation process where the objective Qos attribute value and/or subjective Qos attribute value is generated is stored in an invocation recording table at the same time, where the invocation information may include an identifier (ID) of a user that invokes the OpenAPI, an identifier (ID) of the invoked OpenAPI, and invocation time, invocation times, and so on. A mapping exists between the Qos attribute information table and the invocation recording table, and the two keep synchronous, namely, every time a new piece of invocation information is added to the invocation recording table, a Qos attribute value of a corresponding OpenAPI in the Qos attribute information table needs to be updated.

Further, considering that a current network status has a large effect on a Qos attribute value, in order to reduce the effect of the network status on a current Qos attribute value, before the obtained objective Qos attribute value and/or the obtained subjective Qos attribute value is added to the Qos attribute information table, the selection device specifically performs weighted average processing on each Qos attribute value according to formula (4).

$$Y'(t)=\lambda \times Y(t)+(1-\lambda)\times Y'(t-1) \qquad (4)$$

Y(t) indicates an objective Qos attribute value and/or a subjective Qos attribute value, where the objective Qos attribute value and/or the subjective Qos attribute value is obtained in a tth time point; Y'(t) indicates an objective Qos attribute value and/or a subjective Qos attribute value, where the objective Qos attribute value and/or the subjective Qos attribute value has undergone the weighted average processing in the tth time point; and Y'(t−1) indicates an objective Qos attribute value and/or a subjective Qos attribute value, where the objective Qos attribute value and/or the subjective Qos attribute value has undergone the weighted average processing in a (t−1)th time point, where the (t−1) th time point refers to a time point before the tth time point, namely, formula (4) indicates that a Qos attribute value obtained at a previous time point is used to perform weighted average processing on a currently obtained Qos attribute value. λ is a constant coefficient, a preferred value range is from 0 to 1, and a more preferred value range is from 0.2 to 0.3, for example, when λ is 0.25, formula (4) becomes: Y'(t)=0.25×Y(t)+0.75×Y'(t−1).

Based on the foregoing, a procedure of a method for generating a Qos attribute value is further described in the following embodiments of the present invention.

An implementation manner for generating an objective Qos attribute value is: A detection program inserted in an invocation process detects each OpenAPI invocation process initiated by a test user, and the detection program obtains an objective Qos attribute value of each OpenAPI. Specifically, a proper position is selected to be inserted with the detection program in a process that a user invokes an OpenAPI through a selection device, namely, a code of the detection program is built in an invocation program code; and when the user initiates an invocation request for invoking an OpenAPI, the detection program code is activated to detect the whole invocation process, for example, record time at which the invocation request is initiated, time at which an invocation result is returned, and a response status code, so as to obtain response time (a difference between the time at which the invocation result is returned and the time at which the invocation request is initiated), and the response status code obtains availability of the OpenAPI (namely, whether the invocation is successful). Further, the detection program may further obtain current stability of the OpenAPI by synthesizing historical information of the availability, namely, performing a synthesis evaluation on recorded availability of the OpenAPI in a previous time period. After each kind of objective Qos attribute value is obtained, the selection device further stores the objective Qos attribute value in a Qos attribute information table, and stores invocation information of invoking the OpenAPI in an invocation recording table.

Another implementation manner for generating an objective Qos attribute value is: A detection program inserted in an invocation process detects a process that a selection device invokes each OpenAPI cyclically, and the detection program obtains an objective Qos attribute value of each OpenAPI. Specifically, the selection device provides a management interface for a user or a manager, where information that needs to be set by the user or the manager is included on the management interface, for example, "set a time interval for executing a cyclical operation", namely, a delay for running tasks in batches after a timer is started, where a unit of time may be a millisecond; and "start a cyclical function", and "end a cyclical function". The user or the manager can start, by clicking the "start a cyclical function", the selection device, to cyclically invoke each OpenAPI in an OpenAPI database automatically according to a set time interval, and the detection program obtains an objective Qos attribute value that corresponds to each OpenAPI, for example, availability, response time, stability, and encryption security. The user or the manager can enable, by clicking the "end a cyclical function", the selection device to end an OpenAPI cyclical invocation operation. Further, a function of viewing performance of the selection device is further included on the management interface. Before clicking the "start a cyclical function", the user or the manager may click the "function of viewing performance of the selection device" to obtain an average usage status of a physical resource of the selection device, for example, may view a CPU usage, a memory usage, and the total number of threads. Afterwards, the user or the manager determines, through a synthesis evaluation, whether a current status of the selection device is suitable to execute a cyclical operation, and when the average usage status meets a preset status condition, instructs the selection device to cyclically invoke each OpenAPI by clicking the "start a cyclical function".

An implementation manner for obtaining a subjective Qos attribute value is: A test user evaluates a subjective Qos attribute in a subjective Qos attribute list on an evaluation interface according to historical evaluation information of an OpenAPI on the evaluation interface, so as to return a subjective Qos attribute value through the evaluation interface. The evaluation interface is provided by a selection device or an evaluation program that is embedded in the OpenAPI for the test user after an OpenAPI invocation process ends.

When the evaluation interface is provided by a selection device for the user, the implementation manner is specifically: After the user initiates, through an open capability invocation tool, an invocation request for invoking an OpenAPI, the selection device invokes the OpenAPI according to the invocation request, where reference may be made to the description in the foregoing embodiments for an invocation process. After the invocation ends, the selection device provides an evaluation interface for the user, where the evaluation interface includes historical evaluation information and a subjective Qos attribute list of the OpenAPI. The historical evaluation information on the evaluation interface mainly refers to a subjective Qos attribute value of the OpenAPI, where the subjective Qos attribute value of the OpenAPI is given by another user in a previous time period. The user refers to the historical evaluation information, evaluates each subjective Qos attribute in the subjective Qos attribute list, and gives a value of each subjective Qos attribute, and returns the subjective Qos attribute value to the selection device by clicking a submission function on the evaluation interface. After receiving the subjective Qos attribute value of the OpenAPI, the selection device stores the subjective Qos attribute value in a Qos attribute information table.

When the evaluation interface is provided by an evaluation program for the user, the implementation manner is specifically: In order to obtain evaluation information of the user more conveniently, an OpenAPI developer embeds an evaluation program (also called an evaluation control) in an OpenAPI, when the user finishes invoking an OpenAPI, the evaluation program embedded in the OpenAPI is activated, and the evaluation program obtains historical invocation information of the OpenAPI (including an ID of the OpenAPI, an ID of a user that initiates the invocation, and so on) from an invocation recording table of a selection device, then obtains historical evaluation information of the OpenAPI from a Qos attribute information table of the selection device according to the historical invocation information, and finally, provides an evaluation interface that includes the historical evaluation information and a subjective Qos attribute list for the user. The user refers to the historical evaluation information, evaluates each subjective Qos attribute in the subjective Qos attribute list, gives a value of each subjective Qos attribute, and returns the subjective Qos attribute value to the selection device by clicking a submission function on the evaluation interface.

Based on the foregoing implementation manners for generating a subjective Qos attribute value, the selection device in this embodiment may further adopt a plug-in such as rating and progressbar of jquery, to draw a wave curve of some Qos attributes according to a Qos attribute value in the Qos attribute information table and corresponding invocation information in the invocation recording table, and provide the drawn wave curve for the user through the evaluation interface, so that the user makes a correct evaluation on a current OpenAPI. For example, a wave curve of correctness, a wave curve of performance/price, and a wave curve of a synthesis evaluation in a time period may be drawn, and a wave curve of an objective Qos attribute may further be drawn, so as to assist the user to evaluate a subjective Qos attribute.

In the foregoing implementation manners, a Qos attribute value of an OpenAPI is obtained by detecting an OpenAPI invocation process or is fed back by a user, and the obtained Qos attribute value meets a demand of an OpenAPI field, and can correctly reflect a performance difference among OpenAPIs, which provides a foundation for an embodiment of OpenAPI selection, so that in the foregoing embodiments, an OpenAPI with better performance can be selected from numerous OpenAPIs with equivalent functions for a user, thereby solving a problem in the prior art, and improving the quality of service of an OpenAPI for the user.

Figure 5:
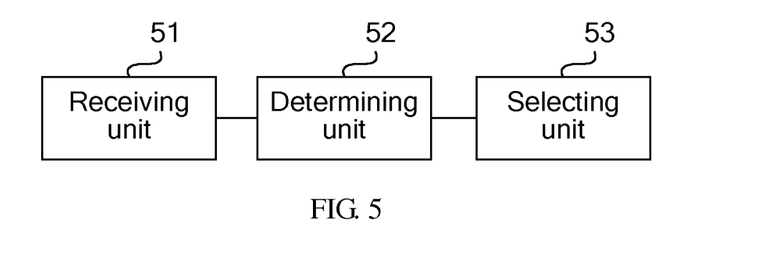
FIG. 5 is a schematic structural diagram of an OpenAPI selection device according to a fifth embodiment of the present invention.

FIG. 5 is a schematic structural diagram of an OpenAPI selection device according to a fifth embodiment of the present invention. As shown in FIG. 5, the selection device in this embodiment includes: a receiving unit 51, a determining unit 52, and a selecting unit 53.

The receiving unit 51 is configured to receive an invocation request from a user, where the invocation request includes an OpenAPI function parameter. The determining unit 52 is connected to the receiving unit 51, and is configured to determine an OpenAPI equivalent set according to the OpenAPI function parameter, where the OpenAPI equivalent set includes multiple OpenAPIs with the same function. The selecting unit 53 is connected to the determining unit 52, and is configured to select a target OpenAPI from the multiple OpenAPIs according to a Qos attribute value that corresponds to each OpenAPI in the OpenAPI equivalent set.

Function units of the OpenAPI selection device in this embodiment may be configured to execute the method procedure in the embodiment shown in FIG. 1, and reference is made to the description of the method embodiment for a working principle, which is not described again.

With the OpenAPI selection device in this embodiment, a Qos attribute value is used to reflect performance of different OpenAPIs with the same function, based on which a target OpenAPI is selected from numerous OpenAPIs with equivalent functions, thereby solving a problem in the prior art that an OpenAPI with better performance cannot be selected from numerous OpenAPIs with equivalent functions, selecting an OpenAPI with better performance for a user, and improving the quality of service for the user.

Figure 6:
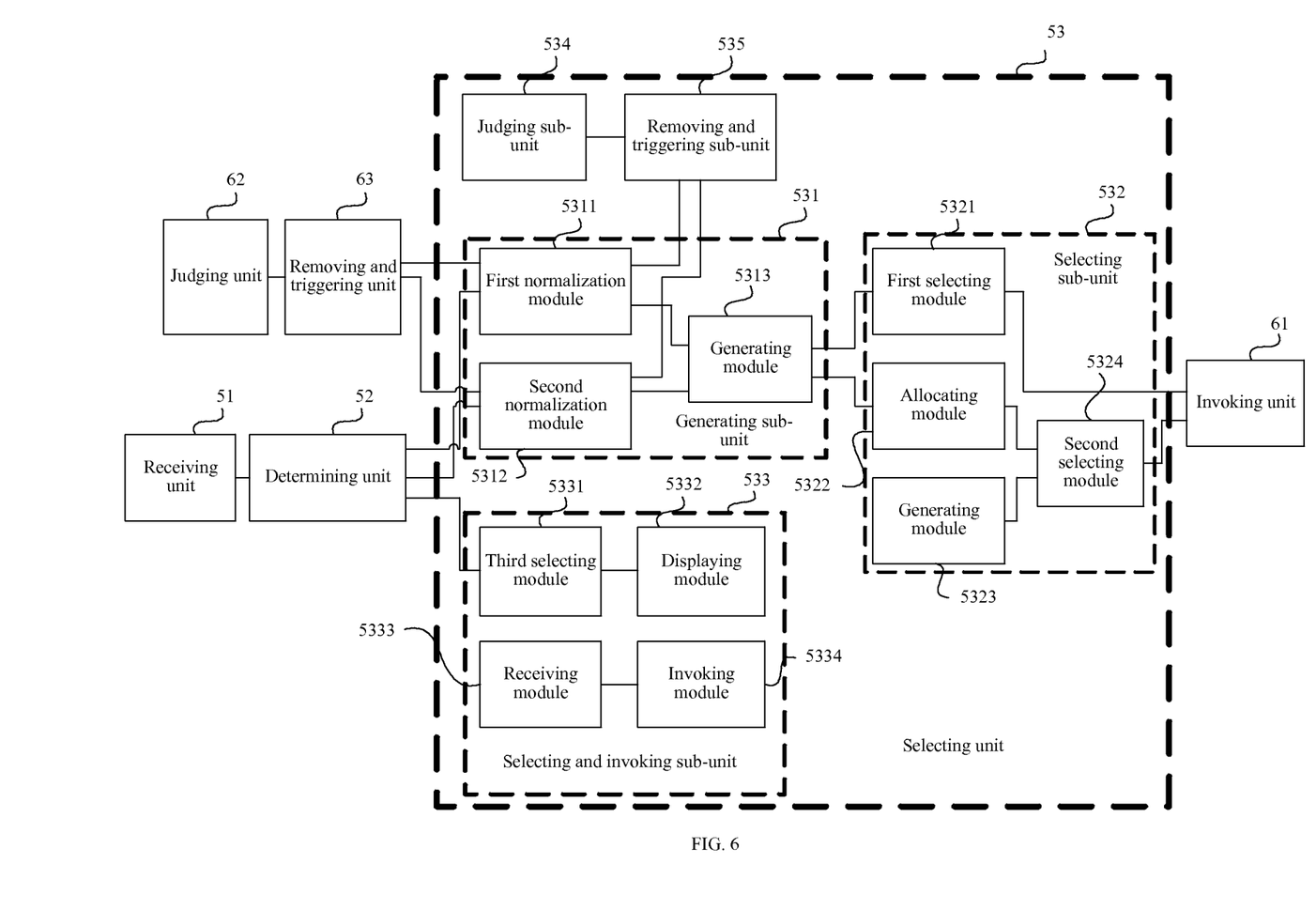
FIG. 6 is a schematic structural diagram of an OpenAPI selection device according to a sixth embodiment of the present invention.

FIG. 6 is a schematic structural diagram of an OpenAPI selection device according to a sixth embodiment of the present invention. This embodiment is implemented based on the embodiment shown in FIG. 5, and as shown in FIG. 6, the selection device in this embodiment further includes: an invoking unit 61, a judging unit 62, and a removing and triggering unit 63.

The invoking unit 61 is connected to the selecting unit 53, and is configured to invoke the target OpenAPI from an OpenAPI database after the selecting unit 53 selects the target OpenAPI. The judging unit 62 is configured to determine whether the OpenAPI database returns an invocation result. The removing and triggering unit 63 is connected to the judging unit 62 and the selecting unit 53, and is configured to: when a determination result of the judging unit 62 is no, remove the target OpenAPI from the OpenAPI equivalent set, and trigger the selecting unit 53, to re-execute an operation of selecting a target OpenAPI from the multiple OpenAPIs according to a Qos attribute value that corresponds to each OpenAPI in the OpenAPI equivalent set; and in addition, when the determination result of the judging unit 62 is yes, return an invocation result to the user, and end this invocation operation.

The foregoing function units may be configured to execute the method procedure shown in FIG. 2, and reference is made to the description of the embodiment shown in FIG. 2 for a working principle, which is not described again. With the OpenAPI selection device in this embodiment, a selected target OpenAPI is invoked, and when the invocation is not successful, selection is continued in an OpenAPI equivalent set where the OpenAPI that is not successfully invoked is removed, so as to ensure that a target OpenAPI is successfully selected for a user, and ensure that the user obtains a service, thereby improving the quality of service of an OpenAPI for the user.

Further, the selecting unit 53 in this embodiment includes: a generating sub-unit 531 and a selection sub-unit 532. The generating sub-unit 531 is connected to the determining unit 52, and is configured to perform normalization processing on the Qos attribute value that corresponds to each OpenAPI, so as to generate a user applicability value that corresponds to each OpenAPI. The selection sub-unit 532 is connected to the generating sub-unit 531, and is configured to select the target OpenAPI from the multiple OpenAPIs according to the user applicability value that corresponds to each OpenAPI.

Further, an implementation manner of the selection sub-unit 532 includes: a first selection module 5321. The first selection module 5321 is connected to the generating sub-unit 531, and is configured to select an OpenAPI with a maximum user applicability value from the multiple OpenAPIs as the target OpenAPI.

Another implementation manner of the selection sub-unit 532 includes: an allocating module 5322, a generating module 5323, and a second selection module 5324. Specifically, the allocating module 5322 is connected to the generating sub-unit 531, and is configured to allocate a selection probability to each OpenAPI according to the user applicability value that corresponds to each OpenAPI, where a sum of all selection probabilities is 1. The generating module 5323 is configured to generate a random number, for example, a random number from 0 to 1. The second selection module 5324 is connected to the allocating module 5322 and the generating module 5323, and is configured to select the target OpenAPI from the multiple OpenAPIs according to the random number and the selection probability.

The second selection module 5324 is specifically configured to sort selection probabilities in ascending order, compare the random number with the sorted selection probabilities in sequence, and select an OpenAPI that corresponds to a first selection probability that is larger than the random number as the target OpenAPI.

The foregoing function units may be configured to execute the method procedure shown in FIG. 3A and FIG. 3B, and reference is made to the description of the method embodiment shown in FIG. 3A and FIG. 3B for a working principle, which is not described again.

Further, as shown in FIG. 6, the selecting unit 53 in this embodiment further includes: a selecting and invoking sub-unit 533, a judging sub-unit 534, and a removing and triggering sub-unit 535.

The selecting and invoking sub-unit 533 is connected to the determining unit 52, and is configured to randomly select an initial OpenAPI from the OpenAPI equivalent set, and invoke the initial OpenAPI from the OpenAPI database. The judging sub-unit 534 is configured to determine whether an invocation result is returned. The removing and triggering sub-unit 535 is connected to the judging sub-unit 534 and the generating sub-unit 531, and is configured to: when a determination result of the judging sub-unit 534 is no, remove the initial OpenAPI from the OpenAPI equivalent set, and trigger the generation sub-unit 531, to execute an operation of performing normalization processing on the Qos attribute value that corresponds to each OpenAPI, so as to generate the user applicability value that corresponds to each OpenAPI.

As shown in FIG. 6, an implementation structure of the selecting and invoking sub-unit 533 includes: a third selecting module 5331, a displaying module 5332, a receiving module 5333, and an invoking module 5334. Specifically, the third selecting module 5331 is connected to the determining unit 52, and is configured to randomly select an initial OpenAPI from the OpenAPI equivalent set. The displaying module 5332 is connected to the third selecting module 5331, and is configured to display a parameter list of the initial OpenAPI to the user through an invocation interface. The receiving module 5333 is configured to receive parameter information of the initial OpenAPI, where the parameter information of the initial OpenAPI is submitted by the user through the invocation interface. The invoking module 5334 is connected to the receiving module 5333, and is configured to invoke the initial OpenAPI from the OpenAPI database according to the parameter information.

The foregoing function sub-units or modules may be configured to execute the method procedure shown in FIG. 4, and reference is made to the description of the method embodiment shown in FIG. 4 for a working principle, which is not described again.

As shown in FIG. 6, an implementation structure of the generating sub-unit 531 includes: a first normalization module 5311, a second normalization module 5312, and a generating module 5313. Specifically, the first normalization module 5311 is connected to the determining unit 52, and is configured to perform normalization processing on an increment Qos attribute value according to formula (1). The second normalization module 5312 is connected to the determining unit 52, and is configured to perform normalization processing on a decrement Qos attribute value according to formula (2). The generating module 5313 is connected to the first normalization module 5311 and the second normalization module 5312, and is configured to generate, according to formula (3), a user applicability value that corresponds to each OpenAPI.

The foregoing function units may be configured to execute part of the method procedure shown in FIG. 3A, and reference is made to the description of the method embodiment shown in FIG. 3A, which is not described again.

With the OpenAPI selection device in this embodiment, through the foregoing function units, sub-units, or modules, a target OpenAPI can be selected from numerous OpenAPIs with equivalent functions according to a Qos attribute value, thereby solving a problem in the prior art that an OpenAPI with better performance cannot be selected from numerous OpenAPIs with equivalent functions, selecting an OpenAPI with better performance for a user, and improving the quality of service for the user.

Figure 7:
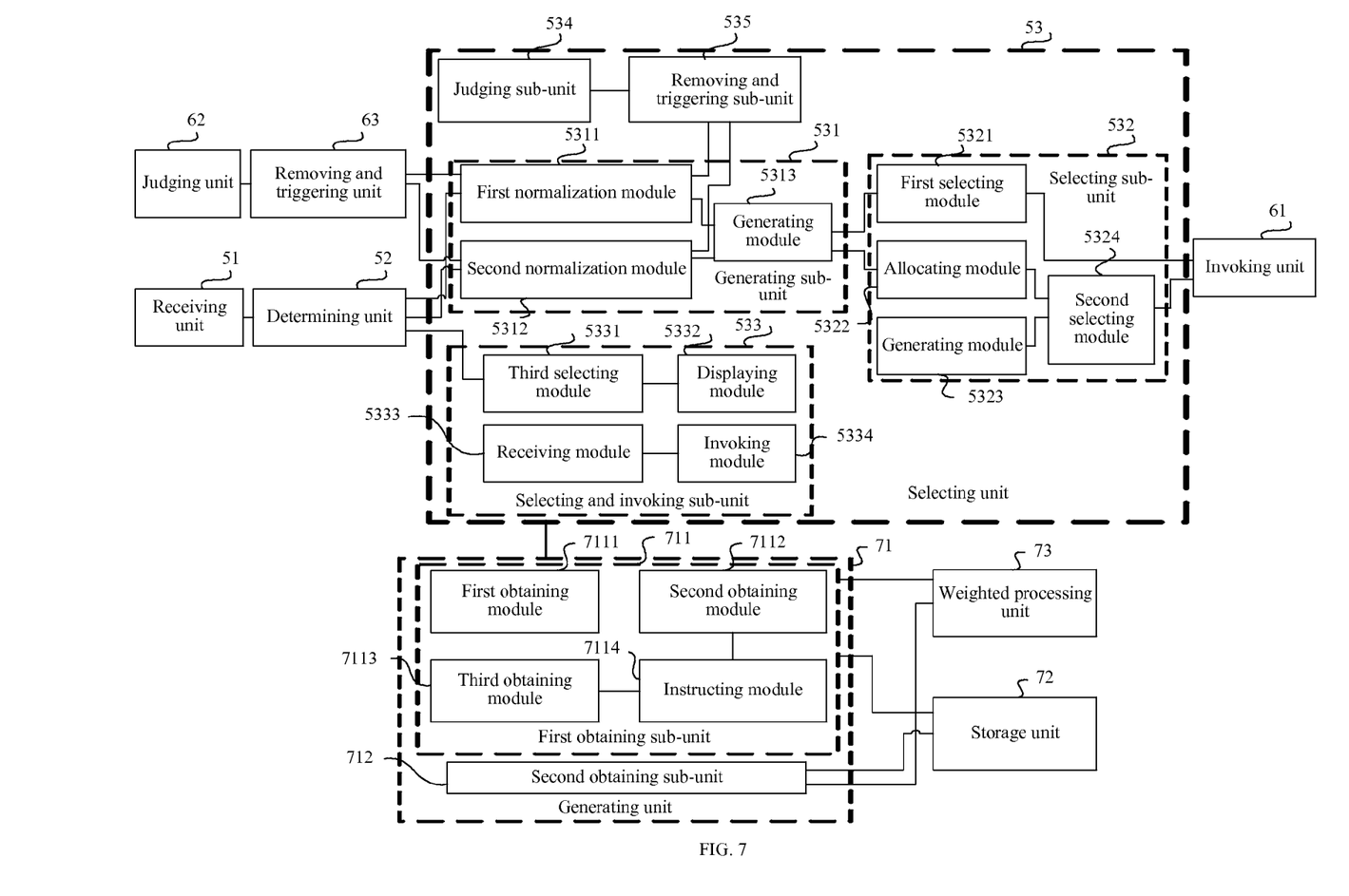
FIG. 7 is a schematic structural diagram of an OpenAPI selection device according to a seventh embodiment of the present invention.

FIG. 7 is a schematic structural diagram of an OpenAPI selection device according to a seventh embodiment of the present invention. This embodiment is implemented based on the embodiment shown in FIG. 6, and as shown in FIG. 7, the selection device in this embodiment further includes: a generating unit 71. The generating unit 71 is configured to, before a Qos attribute value is used, generate a Qos attribute value that corresponds to each OpenAPI.

As shown in FIG. 7, the generating unit 71 may specifically include any one of the following obtaining sub-units or a combination thereof: a first obtaining sub-unit 711, configured to detect each OpenAPI invocation process, so as to obtain an objective Qos attribute value that corresponds to each OpenAPI; and a second obtaining sub-unit 712, configured to obtain a subjective Qos attribute value that is fed back by a user after each OpenAPI is invoked.

Further, the selection device in this embodiment further includes: a storage unit 72. The storage unit 72 is connected to the first obtaining sub-unit 711 and/or the second obtaining sub-unit 712, and is configured to store the objective Qos attribute value and/or the subjective Qos attribute value in a Qos attribute information table, where the objective Qos attribute value and/or the subjective Qos attribute value corresponds to each OpenAPI, and store invocation information that corresponds to each OpenAPI in an invocation recording table.

Based on the foregoing function units, the selection device further includes: a weighted processing unit 73. The weighted processing unit 73 is connected to the storage unit 72, and the first obtaining sub-unit 711 and/or the second obtaining sub-unit 712, and is configured to perform weighted average processing on the objective Qos attribute value and/or the subjective Qos attribute value according to formula (4) before the storage unit 72 stores the objective Qos attribute value and/or the subjective Qos attribute value in the Qos attribute information table, where the objective Qos attribute value and/or the subjective Qos attribute value corresponds to each OpenAPI; and enable the storage unit 72 to store the objective Qos attribute value and/or the subjective Qos attribute value in the Qos attribute information table, where the objective Qos attribute value and/or the subjective Qos attribute value has undergone the weighted average processing.

The foregoing function units may be configured to execute the method procedure for generating a Qos attribute value provided in the foregoing method embodiment, and reference is made to the description of the method embodiment for a working principle, which is not described again.

Further, the first obtaining sub-unit 711 includes any one of the following obtaining modules or a combination thereof: a first obtaining module 7111, configured to insert a detection program in an invocation process, where the detection program detects each OpenAPI invocation process initiated by a test user, and obtains an objective Qos attribute value of each OpenAPI; and a second obtaining module 7112, configured to insert a detection program in an invocation process, where the detection program detects a process that the OpenAPI selection device cyclically invokes each OpenAPI, and obtains an objective Qos attribute value of each OpenAPI.

When the first obtaining sub-unit 711 includes the second obtaining module 7112, the first obtaining sub-unit 711 further includes: a third obtaining module 7113 and an instructing module 7114. Specifically, the third obtaining module 7113 is configured to obtain an average usage status of a physical resource of the OpenAPI selection device. The instructing module 7114 is connected to the third obtaining module 7113, and is configured to, when the average usage status meets a preset status condition, instruct the OpenAPI selection device to cyclically invoke each OpenAPI, so as to provide a foundation for the second obtaining module 7112.

The second obtaining sub-unit 712 is specifically configured to obtain a subjective Qos attribute value that is returned by the test user through an evaluation interface, where the evaluation interface is provided by the OpenAPI selection device or an evaluation program that is embedded in an OpenAPI for the test user after an OpenAPI invocation process ends, and the test user specifically evaluates a subjective Qos attribute in a subjective Qos attribute list on the evaluation interface according to historical evaluation information of an OpenAPI on the evaluation interface.

The foregoing function sub-units or modules may be configured to execute the method procedure for generating a Qos attribute value, and reference is made to the description of the method embodiment for a working principle, which is not described again.

With the OpenAPI selection device in this embodiment, the foregoing function units, sub-units, or modules are used to obtain a Qos attribute value of an OpenAPI, the obtained Qos attribute value meets a demand of an OpenAPI field, and can correctly reflect a performance difference among OpenAPIs, which provides a foundation for an OpenAPI selection device to select an OpenAPI, so that an OpenAPI with better performance can be selected from numerous OpenAPIs with equivalent functions for a user, thereby solving a problem in the prior art, and improving the quality of service of an OpenAPI for the user.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or replacements do not cause the essence of corresponding technical solutions to depart from the scope of the technical solutions in the embodiments of the present invention.

What is claimed is:

1. An open application programming interface OpenAPI selection method, comprising:
receiving an invocation request from a user, wherein the invocation request comprises an OpenAPI function parameter;
determining an OpenAPI equivalent set according to the OpenAPI function parameter, wherein the OpenAPI equivalent set comprises multiple OpenAPIs with the same function; and
selecting a target OpenAPI from the multiple OpenAPIs according to a quality of service Qos attribute value that corresponds to each OpenAPI in the OpenAPI equivalent set.

2. The OpenAPI selection method according to claim 1, wherein after the selecting the target OpenAPI, the method further comprises:
invoking the target OpenAPI;
determining whether an invocation result is returned; and
if a determination result is no, removing the target OpenAPI from the OpenAPI equivalent set, and re-executing an operation of selecting a target OpenAPI from the multiple OpenAPIs according to a Qos attribute value that corresponds to each OpenAPI in the OpenAPI equivalent set.

3. The OpenAPI selection method according to claim 1, wherein the selecting the target OpenAPI from the multiple OpenAPIs according to the quality of service Qos attribute value that corresponds to each OpenAPI in the OpenAPI equivalent set comprises:
performing normalization processing on the Qos attribute value that corresponds to each OpenAPI, so as to generate a user applicability value that corresponds to each OpenAPI; and
selecting the target OpenAPI from the multiple OpenAPIs according to the user applicability value that corresponds to each OpenAPI.

4. The OpenAPI selection method according to claim 3, wherein the selecting the target OpenAPI from the multiple OpenAPIs according to the user applicability value that corresponds to each OpenAPI comprises:
selecting an OpenAPI with a maximum user applicability value from the multiple OpenAPIs as the target OpenAPI.

5. The OpenAPI selection method according to claim 3, wherein the selecting the target OpenAPI from the multiple OpenAPIs according to the user applicability value that corresponds to each OpenAPI comprises:

allocating a selection probability to each OpenAPI according to the user applicability value that corresponds to each OpenAPI;
generating a random number; and
selecting the target OpenAPI from the multiple OpenAPIs according to the random number and the selection probability.

6. The OpenAPI selection method according to claim 5, wherein the selecting the target OpenAPI from the multiple OpenAPIs according to the random number and the selection probability comprises:
sorting selection probabilities in ascending order;
comparing the random number with the sorted selection probabilities in sequence; and
selecting an OpenAPI that corresponds to a first selection probability that is larger than the random number as the target OpenAPI.

7. The OpenAPI selection method according to claim 3, wherein before the performing normalization processing on the Qos attribute value that corresponds to each OpenAPI, so as to generate the user applicability value that corresponds to each OpenAPI, the method comprises:
randomly selecting an initial OpenAPI from the OpenAPI equivalent set, and invoking the initial OpenAPI;
determining whether an invocation result is returned; and
when a determination result is no, removing the initial OpenAPI from the OpenAPI equivalent set, and executing an operation of performing normalization processing on the Qos attribute value that corresponds to each OpenAPI, so as to generate the user applicability value that corresponds to each OpenAPI.

8. The OpenAPI selection method according to claim 7, wherein the invoking the initial OpenAPI comprises:
displaying a parameter list of the initial OpenAPI to the user through an invocation interface;
receiving parameter information of the initial OpenAPI, wherein the parameter information of the initial OpenAPI is submitted by the user through the invocation interface; and
invoking the initial OpenAPI according to the parameter information.

9. An open application programming interface OpenAPI selection device, comprising:
a receiving unit, configured to receive an invocation request from a user, wherein the invocation request comprises an OpenAPI function parameter;
a determining unit, configured to determine an OpenAPI equivalent set according to the OpenAPI function parameter, wherein the OpenAPI equivalent set comprises multiple OpenAPIs with the same function; and
a selecting unit, configured to select a target OpenAPI from the multiple OpenAPIs according to a quality of service Qos attribute value that corresponds to each OpenAPI in the OpenAPI equivalent set.

10. The OpenAPI selection device according to claim 9, further comprising:
an invoking unit, configured to invoke the target OpenAPI after the selecting unit selects the target OpenAPI;
a judging unit, configured to determine whether an invocation result is returned; and
a removing and triggering unit, configured to: when a determination result of the judging unit is no, remove the target OpenAPI from the OpenAPI equivalent set, and trigger the selecting unit, to re-execute an operation of selecting a target OpenAPI from the multiple OpenAPIs according to a Qos attribute value that corresponds to each OpenAPI in the OpenAPI equivalent set.

11. The OpenAPI selection device according to claim 9, wherein the selecting unit comprises:
a generating sub-unit, configured to perform normalization processing on the Qos attribute value that corresponds to each OpenAPI, so as to generate a user applicability value that corresponds to each OpenAPI; and
a selecting sub-unit, configured to select the target OpenAPI from the multiple OpenAPIs according to the user applicability value that corresponds to each OpenAPI.

12. The OpenAPI selection device according to claim 11, wherein the selecting sub-unit comprises:
a first selecting module, configured to select an OpenAPI with a maximum user applicability value from the multiple OpenAPIs as the target OpenAPI.

13. The OpenAPI selection device according to claim 11, wherein the selecting sub-unit comprises:
an allocating module, configured to allocate a selection probability to each OpenAPI according to the user applicability value that corresponds to each OpenAPI;
a generating module, configured to generate a random number; and
a second selecting module, configured to select the target OpenAPI from the multiple OpenAPIs according to the random number and the selection probability.

14. The OpenAPI selection device according to claim 13, wherein the second selecting module is specifically configured to sort selection probabilities in ascending order, compare the random number with the sorted selection probabilities in sequence, and select an OpenAPI that corresponds to a first selection probability that is larger than the random number as the target OpenAPI.

15. The OpenAPI selection device according to claim 11, wherein the selecting unit further comprises:
a selecting and invoking sub-unit, configured to randomly select an initial OpenAPI from the OpenAPI equivalent set, and invoke the initial OpenAPI;
a judging sub-unit, configured to determine whether an invocation result is returned; and
a removing and triggering sub-unit, configured to: when a determination result of the judging sub-unit is no, remove the initial OpenAPI from the OpenAPI equivalent set, and trigger the generating sub-unit, to execute an operation of performing normalization processing on the Qos attribute value that corresponds to each OpenAPI, so as to generate the user applicability value that corresponds to each OpenAPI.

16. An apparatus comprising:
an open application programming interface OpenAPI selection device configured to receive an invocation request from a user, wherein the invocation request comprises an OpenAPI function parameter, to determine an OpenAPI equivalent set according to the OpenAPI function parameter, wherein the OpenAPI equivalent set comprises multiple OpenAPIs with the same function, and to select a target OpenAPI from the multiple OpenAPIs according to a quality of service Qos attribute value that corresponds to each OpenAPI in the OpenAPI equivalent set.

* * * * *